June 5, 1956     E. E. SMITH     2,748,477
HEDGE TRIMMER
Filed June 20, 1955
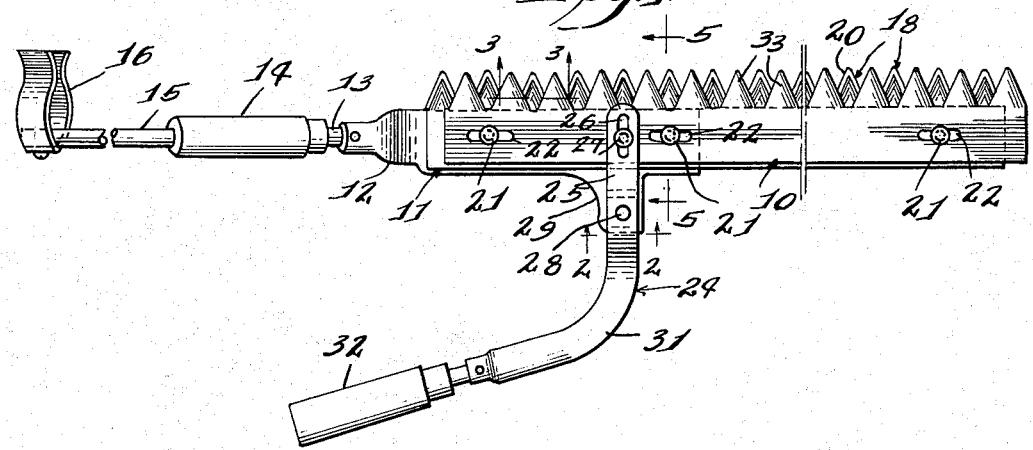
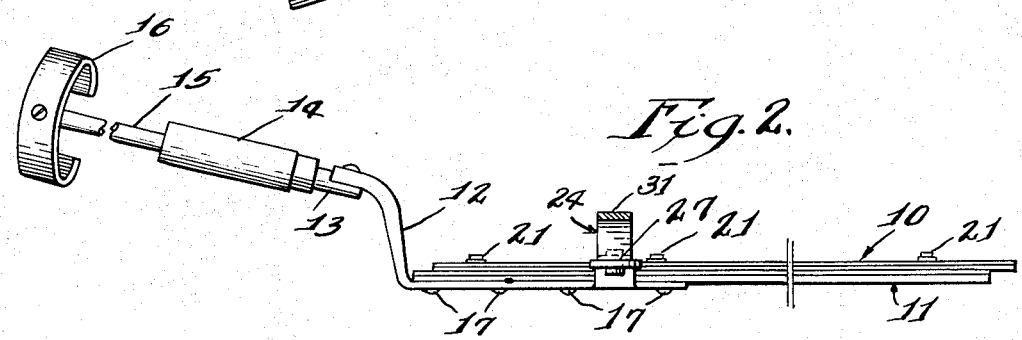
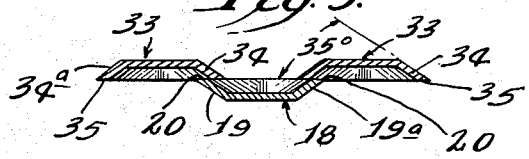
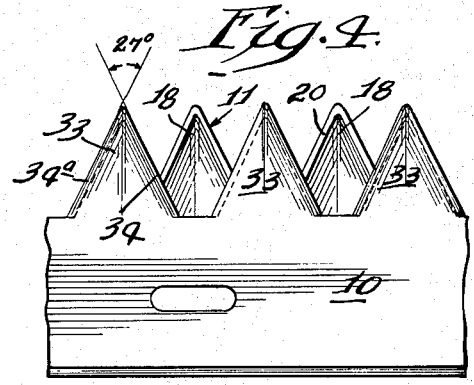
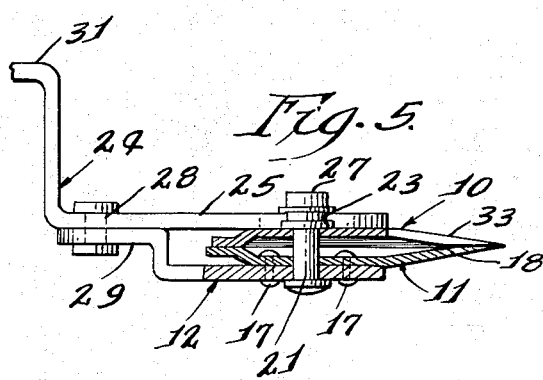
Inventor.
Elwood E. Smith.
By. Wilson & Geppert
Attorneys.

United States Patent Office 2,748,477
Patented June 5, 1956

2,748,477
HEDGE TRIMMER

Elwood E. Smith, Chicago, Ill., assignor to Rovtar Tool & Die Manufacturing Co., Chicago, Ill., a corporation of Illinois Application June 20, 1955, Serial No. 516,509

3 Claims. (Cl. 30—208)

The present invention relates to a hedge trimmer and more particularly to a novel manually-operable hedge trimmer comprising relatively slidable blades each provided with multiple hollow teeth shaped or contoured in a novel manner to provide relatively thin cutting edges that are capable of rapidly and easily cutting the hedge with a minimum of effort.

Hedge trimmers now in use are either the manually-operated simple shears or the power-operated hedge trimmers that have come into wide use due to the effort required and slowness of operation of the manually-operated shears. Power-operated hedge trimmers are expensive and require a long cord and a convenient electrical outlet to which the cord may be attached. Because of the cost of such power-operated hedge trimmers and the necessity of having an electrical outlet located sufficiently close to the hedge or bush to be trimmed to permit their operation, manually-operated shears remain in common use, even though they are inefficient and substantial time and effort are required in their operation.

The present invention comprehends a novel manually-operated hedge trimmer having cutting blades each provided with multiple teeth capable of cutting in a single operation an area of hedge substantially greater than possible with prior types of hedge trimmers, the present device being so constructed as to very appreciably reduce the effort involved in the operation of shears of the type now employed and very appreciably increase the speed of operation over such prior types of shears. By constructing and arranging the multiple teeth in the novel manner disclosed, these teeth will with little manual effort most effectively and evenly cut through multiple branches in trimming a hedge.

Each tooth of the stationary and movable blades is so contoured and disposed at such a predetermined angle as to present sharp cutting edges that effectively and cleanly cut the branches guided into the V-shaped recesses formed between adjacent teeth. The usual shears have the cutting edges of their blades so formed and sharpened that actual cutting is accomplished by an angle approaching a square angle. With the cutting or shearing edges so disposed, movement of the blades when passing each other effects a pinch-off action rather than a cutting action as accomplished by the sharp cutting edges of the present device.

It is an important object of the present invention to provide a novel hedge trimmer for manual operation in which the multiple teeth of the upper and lower blades are so contoured as to be reversely dished with the bevelled or inclined sides of each tooth being ground to provide a cutting edge disposed parallel to the plane of the blade.

A further object of the present invention is the provision of a manually-operated hedge trimmer provided with a fixed and a movable blade each provided with teeth of substantially triangular shape and hollow, the converging sides being similarly bevelled or inclined and their edges ground to provide relatively thin cutting edges for rapidly and easily cutting the branches of a hedge when the teeth of the cutting blades are moved over each other in parallel planes.

The present invention further comprehends the provision of parallel cutting blades movable relative to each other and each blade provided with multiple hollow cutting teeth, the teeth of the lower stationary blade being dished or substantially concave in shape and the teeth of the upper movable or reciprocating blade being reversely dished or substantially convex in shape, the triangularly arranged sides of each blade being bevelled or inclined in such manner as to present multiple, thin cutting edges ground parallel to the plane of these blades and with these inclined or bevelled sides being disposed at an angle of approximately 35° with the plane of its blade.

Another object of the present invention is the provision of a hedge trimmer having a fixed blade and a blade slidably mounted on the fixed blade for reciprocatory movement, each blade having multiple hollow teeth of triangular shape, the converging sides of each hollow tooth having a continuous thin cutting edge and with these cutting edges disposed at an open angle capable of receiving branches between adjacent teeth of these blades in such manner that reciprocating movement between the blades causes an effective cutting action, instead of the familiar shearing or pinching-off action, between adjacent cutting edges.

Further objects are to provide a construction of maximum simplicity, efficiency, economy and ease of assembly and operation, and such further objects, advantages and capabilities as will later more fully appear and are inherently possessed thereby.

In the drawing:

Figure 1 is a top plan view of the novel hedge trimmer.

Fig. 2 is a view in rear elevation of the novel assembly but with the lever arm and movable handle broken away substantially on the line 2—2 of Fig. 1 and viewed in the direction of the arrows.

Fig. 3 is an enlarged fragmentary view in vertical cross section taken longitudinally through the teeth of the upper and lower cutting blades, the view being taken in a plane represented by the line 3—3 of Fig. 1 and viewed in the direction of the arrows.

Fig. 4 is an enlarged fragmentary top plan view of the upper and lower cutting blades.

Fig. 5 is an enlarged fragmentary view in vertical cross section taken in a plane represented by the line 5—5 of Fig. 1 and viewed in the direction of the arrows.

Referring more particularly to the disclosure in the drawings and to the novel embodiment therein shown to illustrate the present invention, the present invention comprehends a hedge trimmer having an upper, longitudinally movable blade 10 and a lower, fixed blade 11 rigidly secured at one end to an end of an offset bracket or arm 12, the other end of the bracket or arm being secured to a rod 13 embedded in or secured to one end of a hand grip 14. Projecting from the other end of this hand grip 14 is a rigid extension or rod 15, which may be an extension of the rod 13 or a separate member, carrying a clamp or holder 16 adapted to fit the forearm of the operator while he grips the hand grip or handle 14 with the hand of that arm.

The fixed blade 11 is secured to its bracket 12 by rivets or other suitable securing means 17 and is provided with a plurality of spaced, substantially triangularly-shaped teeth 18 each dished, hollow or substantially concave with the flat base of each having its opposite sides 19 and 19ª outwardly and upwardly flaring or inclinded at an angle of approximately 35° with the base of each tooth and the plane of the blade. The sides of each triangularly-shaped tooth are provided with a cuting edge 20 with these sides and their cutting edges merging at the apex of each tooth and with the sides 19 and 19a and their cutting edges 20 forming an included angle of approximately 27°.

Spaced pins or rivets 21 are secured to and carried by the lower or fixed blade 11 with the shank of each pin or rivet projecting through an elongated, longitudinally extending slot 22 in the upper reciprocating blade 10 and retained in operative position on the fixed blade 11 by the head 23 of these pins or rivets 21. The blade 10 is longitudinally or slidably movable on the lower fixed blade 11 by a lever or lever arm 24 having its outer or forward end 25 provided with a longitudinally extending slot 26 receiving the shank of a pin or set screw 27 projecting through and movable in the slot 26 but rigidly anchored at its lower end in the upper movable blade 10 to permit the forward end 25 of the lever 24 to reciprocate the blade 10 upon the fixed blade 11.

The lever 24 is pivotally mounted intermediate its length upon a rivet or pin 28 projecting through an offset 29 on the bracket 12, and with its rearwardly projecting portion 31 raised and bent or curved and its outer end rigidly affixed to a handle 32. Thus by oscillating the handle 32 back and forth with one hand while the other hand grips the handle 14 and the arm of this latter hand is steadied by the arm support 16, motion of lever 24 is translated into a reciprocating movement of the upper blade over the fixed lower blade.

The teeth 33 of the upper, movable blade 10 are shaped and rounded at their ends in a manner similar to those of the lower, fixed blade 11 except that they are dished or formed opposite to that of the teeth 18. Each tooth 33 is hollow and substantially convex and of substantially triangular shape with its opposite downwardly and outwardly flaring or inclined sides 34 and 34a arranged to complement the sides and contour of the teeth 18 of the lower, fixed blade 11 and with each side provided with a cutting edge, the cutting edges 35 of the upper teeth 33 and the cutting edges 20 of the lower teeth 18 being disposed and merging at an included angle of approximately 27° whereby any branches disposed between adjacent teeth 18 and 33 will be quickly and cleanly cut or severed throughout the depth or extent of the teeth. In fact, by this angular arrangement, branches of such thickness or toughness that they may be difficult to cut with a prior type of hedge trimmer, with the thin cutting edges of the present device and the open angle between the cutting edges, may be forced or moved forwardly toward the ends of the adjacent teeth. But due to the sharpness of the cutting edges a slicing and cutting action is achieved as the branch or material being cut slides along the adjacent sharp blade.

The present novel construction of hedge trimmer employing sharper and thinner cutting edges disposed or arranged in the manner shown and with the teeth arranged as disclosed, is a distinct improvement over the conventional broad angle, pinch-off edges employed in prior hedge trimmers. This unique cutting action is accomplished by employing a mild steel of low carbon, that is, case hardened only and thus avoiding the brittle hardness throughout the blade but permitting a substantially harder surface at the cutting edge whereby each cutting edge is ground and maintained extremely sharp and is capable of a long life.

The hollow or dished shape of the teeth of each blade, with their converging inclined or bevelled sides, are so designed as to effect the desired angle of the relatively thin cutting edges of each of the blades. These thin cutting edges and the contour of the teeth result in a simple and effective manually-operated device and method of cutting hedges with relatively little effort. By reason of the thin cutting edges, as each tooth cuts into the branch or object to be cut or severed, the angle of the edges of the adjacent teeth is such as to effectively assist in the shearing and cutting action.

Although the included angle formed by the sides of the teeth and their cutting edges is disclosed as approximately 27° and the angle of inclination of the sides of each tooth is preferably approximately 35°, these are illustrative as showing a preferred embodiment and such angles may be varied somewhat from that disclosed so long as they accomplish the disclosed cutting action. In fact, the angle of inclination of the sides of the teeth may be varied from approximately 30° to approximately 45°, although such limits do vary the effectiveness of the cutting operation.

Having thus disclosed the invention, I claim:

1. A manually-operated hedge trimmer comprising a fixed blade having multiple, spaced teeth and provided at one end of the blade with an extension having a clamp at its outer end adapted to support the forearm of the operator and a handle intermediate said clamp and blade to be grasped by the hand of said forearm, a movable blade provided with multiple, spaced teeth, means for mounting said movable blade for longitudinal sliding movement on the fixed blade for cutting branches and portions of said hedge between adjacent teeth on the fixed and movable blades, an offset bracket on said fixed blade, a lever arm pivotally mounted on said bracket and a handle on said lever arm to be grasped by the other hand for effecting longitudinal sliding movement of the movable blade over said fixed blade.

2. A hedge trimmer comprising a fixed blade having multiple, spaced teeth of substantially triangular shape with the teeth being hollow and provided with upwardly and outwardly inclined sides each having a cutting edge, a movable blade slidably mounted on said fixed blade and having multiple, spaced teeth also of substantially triangular shape and with these teeth being hollow and provided with downwardly and outwardly inclined sides each having a cutting edge, the adjacent sides of said teeth of the hollow, fixed and movable blades being inclined in substantially the same plane and presenting relatively thin, cooperating cutting edges, a handle and an arm clamp secured to and projecting from the fixed blade, a lever arm pivotally mounted on said fixed blade and connected to said movable blade for reciprocating the latter over the fixed blade, and a handle on said lever arm to be grasped by the other hand for reciprocating the movable blade over said fixed blade.

3. A hedge trimmer comprising a fixed blade having multiple spaced teeth of substantially triangular shape with the teeth being hollow and provided with upwardly and outwardly inclined sides each having a cutting edge, a reciprocating blade slidably mounted on said fixed blade and having multiple, spaced teeth also of substantially triangular shape and with these teeth being hollow and provided with downwardly and outwardly inclined sides each having a cutting edge and the sides of the teeth on the fixed and reciprocating blades presenting relatively thin cutting edges converging toward the apex of each tooth, a handle secured to the fixed blade for supporting and moving the trimmer over the hedge to be trimmed and provided with an arm support for steadying the arm as said handle is held; a lever pivotally mounted on the fixed blade and loosely connected at one end to the reciprocating blade for slidably moving the latter over the fixed blade, and a handle on the other end of the lever for operating the lever to actuate the reciprocating blade.

References Cited in the file of this patent
UNITED STATES PATENTS

| 1,789,370 | Nylander | Jan. 20, 1931 |
| 2,497,999 | Markham | Feb. 21, 1950 |
| 2,500,434 | Shearer | Mar. 14, 1950 |